US009076256B2

(12) United States Patent
Ishige et al.

(10) Patent No.: US 9,076,256 B2
(45) Date of Patent: Jul. 7, 2015

(54) INFORMATION PROCESSING DEVICE, INFORMATION PROCESSING METHOD, AND PROGRAM

(75) Inventors: Hiroyuki Ishige, Tokyo (JP); Kazuhiro Suzuki, Tokyo (JP); Akira Miyashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 332 days.

(21) Appl. No.: 13/578,952

(22) PCT Filed: Mar. 9, 2011

(86) PCT No.: PCT/JP2011/001382
§ 371 (c)(1),
(2), (4) Date: Aug. 14, 2012

(87) PCT Pub. No.: WO2011/114659
PCT Pub. Date: Sep. 22, 2011

(65) Prior Publication Data
US 2012/0314936 A1 Dec. 13, 2012

(30) Foreign Application Priority Data
Mar. 17, 2010 (JP) ................ 2010-061128

(51) Int. Cl.
G06K 9/36 (2006.01)
G06T 19/00 (2011.01)
G06T 7/00 (2006.01)
G06F 3/01 (2006.01)

(52) U.S. Cl.
CPC ............ *G06T 19/006* (2013.01); *G06T 7/0042* (2013.01); *G06F 3/011* (2013.01)

(58) Field of Classification Search
None
See application file for complete search history.

(56) References Cited

U.S. PATENT DOCUMENTS

| 7,646,394 B1* | 1/2010 | Neely et al. .................... 345/633 |
| 2004/0145594 A1* | 7/2004 | Kobayashi et al. ........... 345/633 |
| 2005/0024388 A1* | 2/2005 | Takemoto ...................... 345/633 |
| 2005/0280661 A1* | 12/2005 | Kobayashi et al. ........... 345/633 |

(Continued)

FOREIGN PATENT DOCUMENTS

| JP | 11-84307 A | 3/1999 |
| JP | 11-237867 A | 8/1999 |
| JP | 11-249779 A | 9/1999 |

(Continued)

OTHER PUBLICATIONS

International Search Report and Written Opinion of the International Searching Authority issued Jun. 21, 2011 in PCT/JP2011/001382.

(Continued)

*Primary Examiner* — Barry Drennan
*Assistant Examiner* — Alexander J Lesnick
(74) *Attorney, Agent, or Firm* — Hazuki International, LLC

(57) ABSTRACT

An information processing apparatus that acquires first posture information corresponding to the information processing apparatus and a first distance coordinate corresponding to the information processing apparatus, and second posture information corresponding to another information processing apparatus and a second distance coordinate corresponding to the another information processing apparatus. The information processing apparatus then calculates an object's position in a virtual space based on the first and second posture information and the first and second distance coordinates.

20 Claims, 15 Drawing Sheets

DIRECTIONS OF COORDINATE SYSTEM ARE NOT COINCIDENT

DIRECTIONS OF COORDINATE SYSTEM ARE COINCIDENT

(56) References Cited

U.S. PATENT DOCUMENTS

2009/0245681 A1* 10/2009 Kobayashi .................... 382/275
2010/0208057 A1* 8/2010 Meier et al. ................... 348/135

FOREIGN PATENT DOCUMENTS

| JP | 2002-149581 A | 5/2002 |
| JP | 2003-242527 A | 8/2003 |
| JP | 2004-129180 A | 4/2004 |
| JP | 2005-50043 A | 2/2005 |

OTHER PUBLICATIONS

Combined Chinese Office Action and Search Report issued Jul. 1, 2014 in Patent Application No. 201180013005 2 (with English language translation)

* cited by examiner

Fig. 6
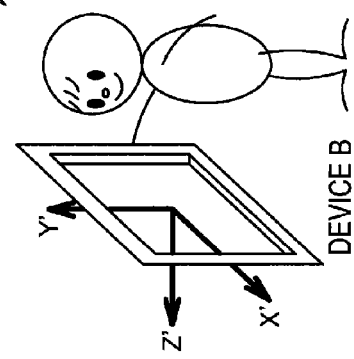
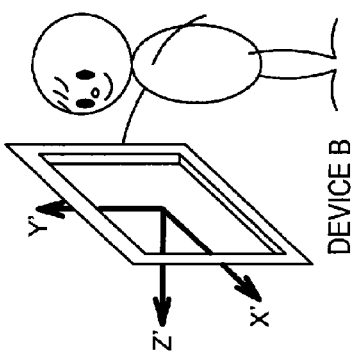
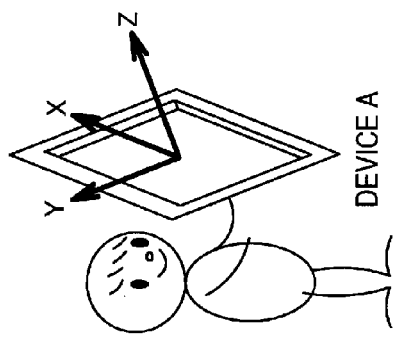
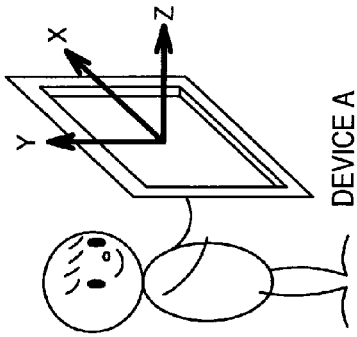

Fig. 7A
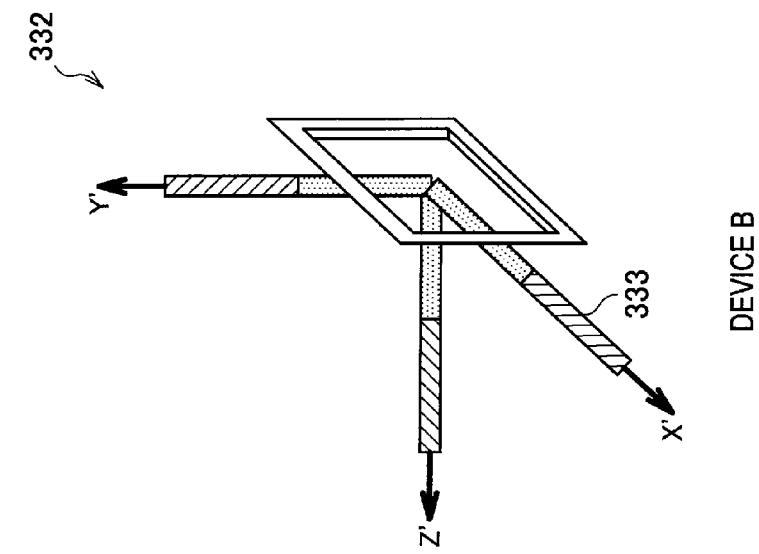
DEVICE B
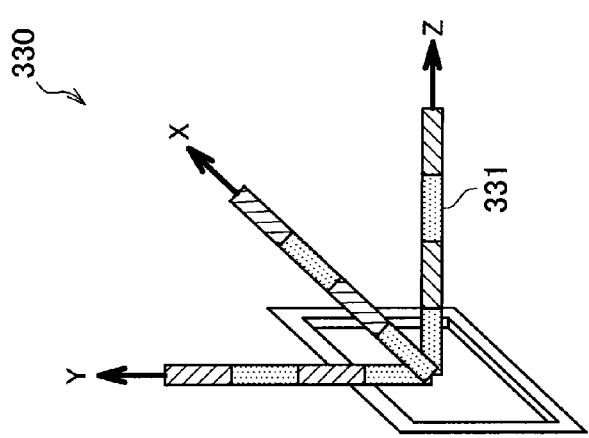
DEVICE A
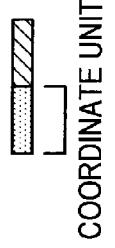
COORDINATE UNIT

Fig. 7B
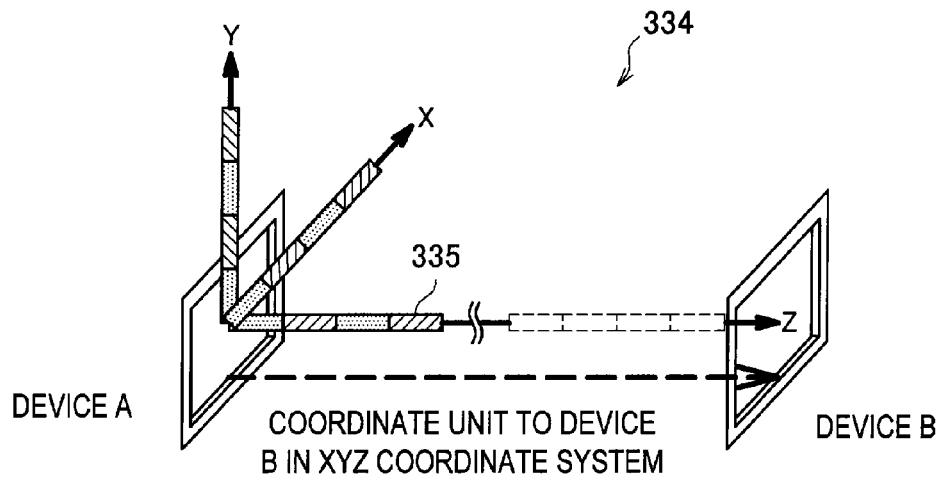
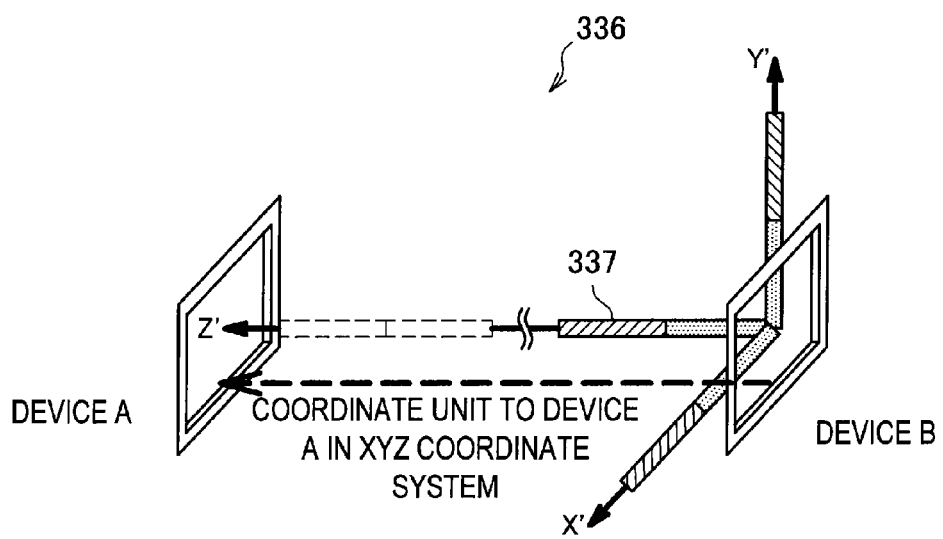

INFORMATION PROCESSING DEVICE, INFORMATION PROCESSING METHOD, AND PROGRAM

TECHNICAL FIELD

The present disclosure relates to an information processing device, an information processing method, and a program, and more particularly, to an information processing device, an information processing method, and a program for sharing augmented reality space with a different device.

BACKGROUND ART

Recently, as an example of the augmented reality technology (hereinafter, referred to as an AR technology), virtual digital information (virtual object) is displayed to be superimposed on real space information such as a real-space image. In addition, the virtual object is shared between a plurality of devices, so that the virtual object is preferably treated as an object in the real space.

In order to superimpose the virtual digital information on the real space information, the virtual space needs to be recognized by analyzing a three-dimensional space structure. For example, in Patent Literature 1, there is disclosed a technology where a plurality of users share a virtual space to allow the position in each of the user's real space and the position in the virtual space to correspond to each other so as for the users to recognize and contact each other in the virtual space.

CITATION LIST

Patent Literature

PTL 1: Japanese Patent Application Laid-Open No. 2002-149581

SUMMARY OF INVENTION

According to a first embodiment, the disclosure is directed to an information processing apparatus, comprising: a processor configured to acquire first posture information corresponding to the information processing apparatus, a first distance coordinate corresponding to the information processing apparatus, second posture information corresponding to another information processing apparatus, and a second distance coordinate corresponding to the another information processing apparatus, wherein the processor is configured to calculate an object's position in a virtual space based on the first and second posture information and the first and second distance coordinates.

The information processing apparatus may further include a detector configured to detect the first posture information by detecting an orientation of the information processing apparatus.

The information processing apparatus may further include an interface configured to acquire the second posture information from the another information processing apparatus.

The information processing apparatus may further include an image capturing device configured to acquire an image corresponding to the another information processing apparatus, wherein the processor is configured to acquire the second posture information based on the acquired image.

The information processing apparatus may further include a detector configured to calculate a distance between the information processing apparatus and the another information processing apparatus.

The detector may be configured to calculate the distance between the information processing apparatus and the another information processing apparatus in the virtual space.

The detector may be configured to calculate the distance between the information processing apparatus and the another information processing apparatus in real space.

The processor may be configured to recognize the virtual space based on the first and second posture information.

The processor may be configured to calculate a normalization value based on a difference between the first distance coordinate and the second distance coordinate.

The processor may be configured to determine a coordinate of the information processing apparatus in the virtual space, and transform the coordinate into a coordinate in the virtual space of the another information processing apparatus based on the normalization value.

The information processing apparatus may further include an interface configured to transmit the transformed coordinate to the another information processing apparatus.

The information processing apparatus may further include an interface configured to receive a coordinate from the another information processing apparatus, wherein the processor is configured to transform the coordinate into the virtual space of the information processing apparatus based on the normalization value.

The first distance coordinate may correspond to a first distance scaling factor and the second distance coordinate may correspond to a second distance scaling factor.

The processor may be configured to calculate a normalization value based on the first and second distance scaling factors.

The processor may be configured to calculate a normalization value by dividing the first distance scaling factor by the second distance scaling factor.

The processor may be configured to designate a coordinate of the information processing apparatus in the virtual space, and transform the coordinate based on the first and second posture information and the normalization value.

The information processing apparatus may further include an interface configured to send the transformed coordinate to the another information processing apparatus.

The information processing apparatus may further include an interface configured to receive a coordinate from the another information processing apparatus.

The processor may be configured to transform the coordinate based on the first and second posture information and the normalization value.

The information processing apparatus may also include a display, wherein the processor is configured to control the display to display the object based on the transformed coordinate.

According to another embodiment, the disclosure is directed to an information processing method performed by an information processing apparatus, the method comprising: acquiring, by a processor of the information processing apparatus, first posture information corresponding to the information processing apparatus, and a first distance coordinate corresponding to the information processing apparatus; acquiring, by an interface of the information processing apparatus, second posture information corresponding to another information processing apparatus and a second distance coordinate corresponding to the another information processing apparatus; and calculating, by the processor of the information processing apparatus, an object's position in a virtual space based on the first and second posture information and the first and second distance coordinates.

According to another embodiment, the disclosure is directed to a non-transitory computer-readable medium including computer program instructions, which when executed by an information processing apparatus, cause the information processing apparatus to perform a method comprising: acquiring first posture information corresponding to the information processing apparatus and a first distance coordinate corresponding to the information processing apparatus; acquiring second posture information corresponding to another information processing apparatus, and a second distance coordinate corresponding to the another information processing apparatus; and calculating an object's position in a virtual space based on the first and second posture information and the first and second distance coordinates.

Technical Problem

However, in Patent Literature 1, although a plurality of the users can recognize each other by sharing the virtual space, it is difficult to dispose a virtual object in the virtual space so that the virtual object is shared by a plurality of devices.

Therefore, in view of the aforementioned issues, the present disclosure provides a new or improved information processing device, an information processing method, and a program capable of allowing easy sharing of a virtual object which is superimposed on a virtual space recognized by analyzing a real space.

Solution to Problem

As described above, according to the present disclosure, it is possible to easily share a virtual object which is superimposed on a virtual space recognized by analyzing a real space.

BRIEF DESCRIPTION OF DRAWINGS

FIG. 6 is a diagram for explaining coincidence of directions of coordinate systems between devices according to the embodiment.

FIG. 7A is a diagram for explaining a coordinate unit according to the embodiment.

FIG. 7B is a diagram for explaining normalization of a space coordinate system according to the embodiment.

DESCRIPTION OF EMBODIMENTS

Figure 1:
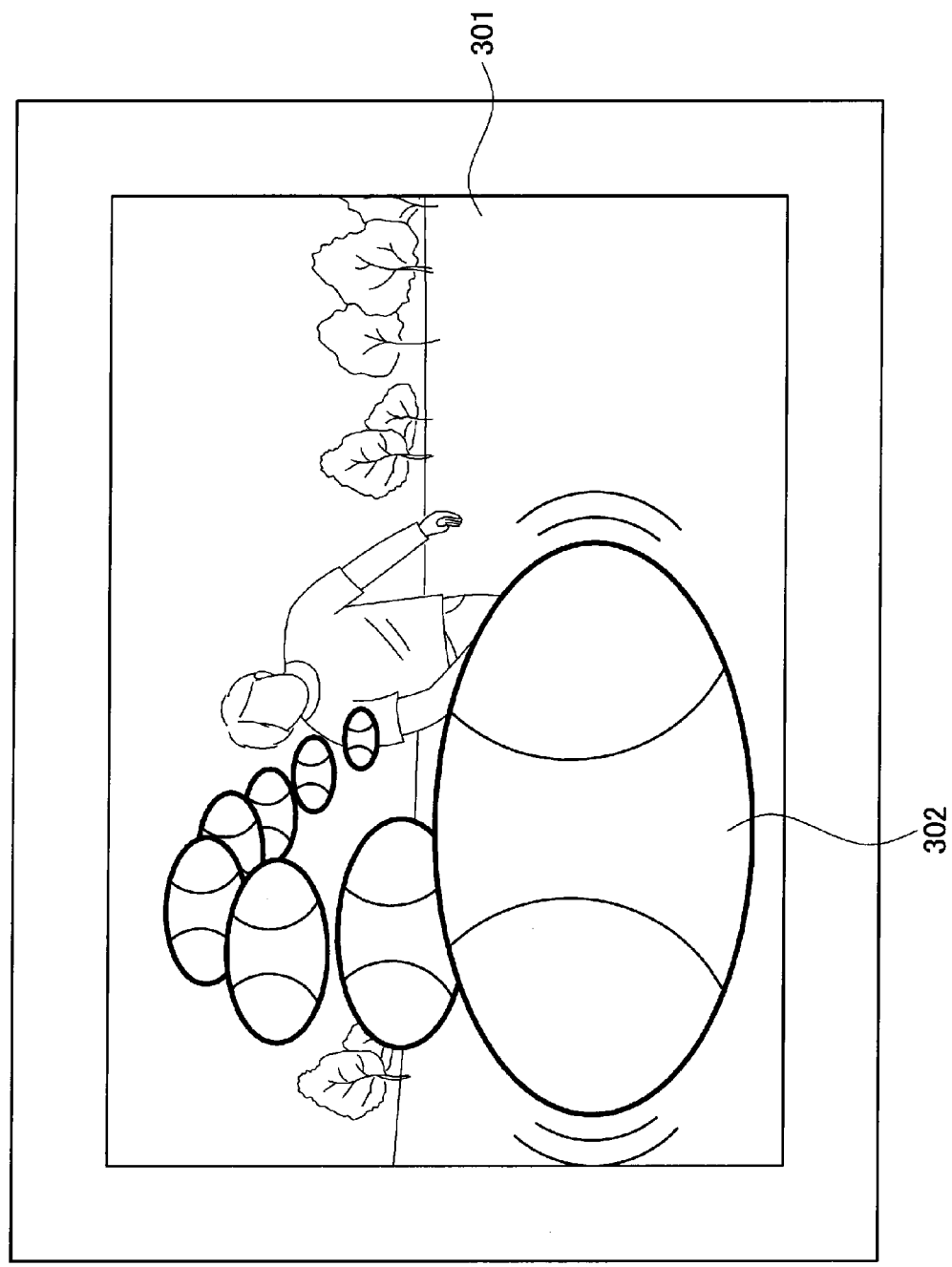
FIG. 1 is a diagram for explaining an AR technology.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In addition, "the best modes of embodiments of the invention" will be described in the following order.
[1] Object of Embodiment
[2] Overview of information processing device
[3] Hardware Configuration of information processing device
[4] Functional Configuration of information processing device
[5] Details of Operations of information processing device
[6] Modification of Details of Operations of Information Processing Device

[1] Object of Embodiment

First, an object of an embodiment is described. Recently, as an example of an augmented reality technology (hereinafter, referred to as an AR technology), virtual digital information (virtual object) is displayed to be superimposed on real space information such as a real-space image. In addition, the virtual object is shared among a plurality of devices, so that the virtual object is preferably treated as an object in the real space.

In order to superimpose the virtual digital information on the real space information, the virtual space needs to be recognized through analysis of a three-dimensional space structure. For example, there is disclosed a technology where a plurality of users share a virtual space to allow the position in each of the user's real space and the position in the virtual space to correspond to each other so as for the users to recognize and contact each other in the virtual space.

However, in the aforementioned technology, although a plurality of the users can recognize each other by sharing the virtual space, it is difficult to dispose a virtual object in the virtual space so that a plurality of devices shares the virtual object. Therefore, in view of the aforementioned issue, an information processing device 10 according to the embodiment is contrived. According to the information processing device 10, it is possible to easily share the virtual object superimposed on the virtual space that is recognized through analysis of the real space.

[2] Overview of Information Processing Device

Hereinbefore, the object of the embodiment was described. Next, the overview of the information processing device 10 according to the embodiment is described with reference to FIGS. 1 to 3. An information processing terminal having a display device such as a mobile phone, a Personal Digital Assistant (PDA), a portable game machine, a small-sized Personal Computer (PC), and the like may be exemplified as the information processing device 10. In the information processing device 10, a virtual object which is to be superimposed on the real-space image is registered.

Figure 2:
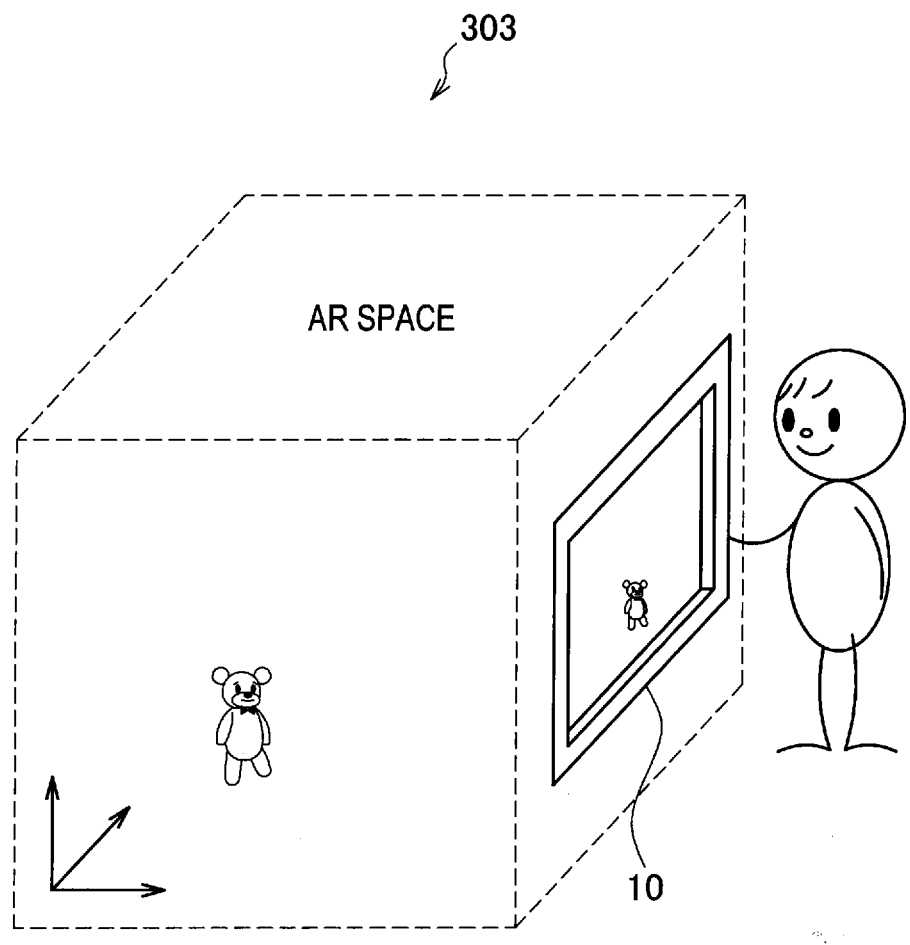
FIG. 2 is a diagram for explaining a virtual space recognized by analyzing a real space.
Figure 3:
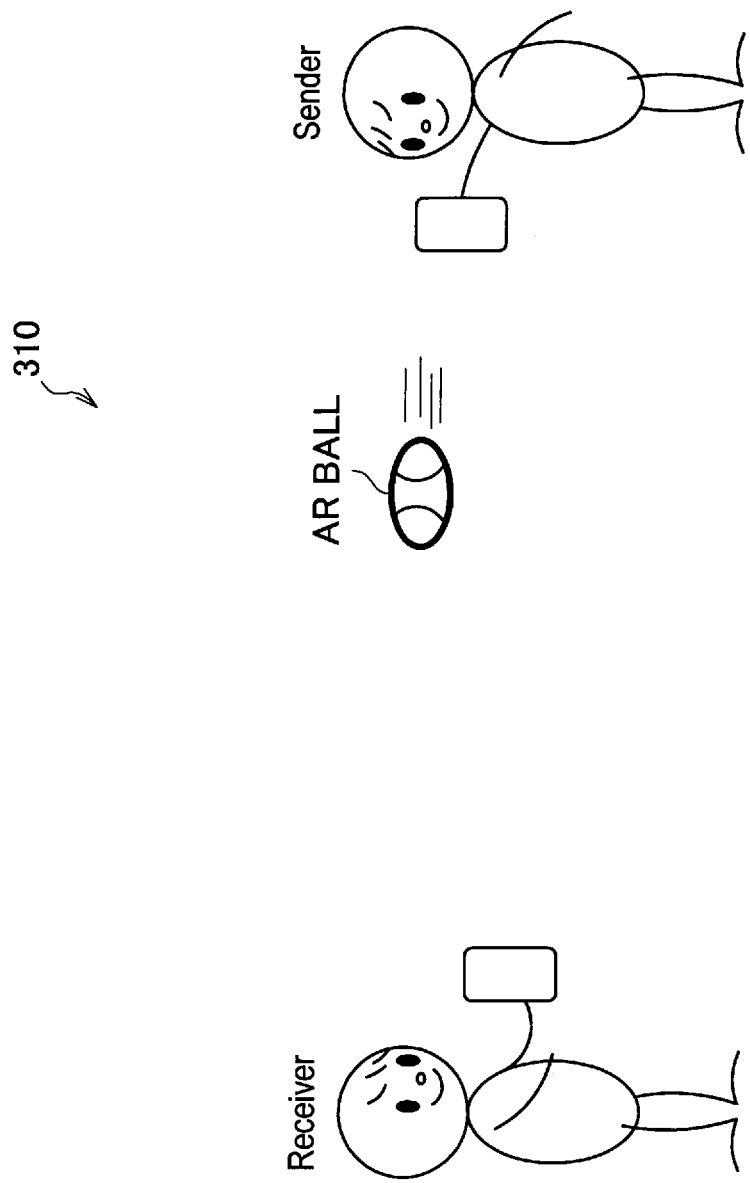
FIG. 3 is a diagram for explaining sharing of an AR object disposed in an AR space.

FIG. 1 is a diagram for explaining an AR technology. FIG. 2 is a diagram for explaining a virtual space (AR space) recognized by analyzing a real space. FIG. 3 is a diagram for explaining the sharing of an AR object which is disposed in the AR space.

In FIG. 1, virtual digital information is superimposed on a real-world image 301 in the real world. Accordingly, complementary information can be synthesized and displayed on the real-world image 301. The real-world image 301 is an image in a real space captured by an image capturing device or the like. In addition, the virtual digital information 302 is a virtual object which is obtained by analyzing the real space and is disposed at an arbitrary position in the real space.

For example, in FIG. 1, a ball, as a virtual object, is superimposed on a display screen where a person taking an action of throwing the ball in the real space is displayed. In this manner, in the information processing device 10, a digital image of the ball is synthesized into the image of the person in the real space, so that it may be shown that the person seams to be throwing the ball really.

Next, the virtual space (AR space) recognized by analyzing the real space is described with reference to FIG. 2. FIG. 2 illustrates a state where a virtual object is disposed in the AR space recognized by using the information processing device 10. The AR space is a space where a space coordinate system of a virtual space recognized by analyzing a real space is superposed on a space coordinate system of the real space. This means that, if the position in the real space coordinate system in the AR space is determined, the coordinate in the AR space is uniquely determined. In other words, in the case where an AR object is disposed at an arbitrary position in the real space, the position at which the AR object is disposed in the AR space is uniquely determined.

The information processing device 10 according to the embodiment shares the AR space with a different device, so that the AR object disposed in the AR space can be shared. For example, as illustrated in the explaining view 310 of FIG. 3, an AR ball as an example of the AR object disposed in the AR space is shared between a receiver and a sender, so that the AR ball can be treated like a ball in the real space. More specifically, the space coordinate system of the virtual space recognized by a device of the receiver side and the space coordinate system of the virtual space recognized by a device of the sender side are allowed to correspond to each other. Next, the virtual object is disposed in the space coordinate system shared by the two devices, so that information of the position, posture, or the like of the virtual object in the virtual space can be shared.

[3] Hardware Configuration of Information Processing Device

Figure 4:
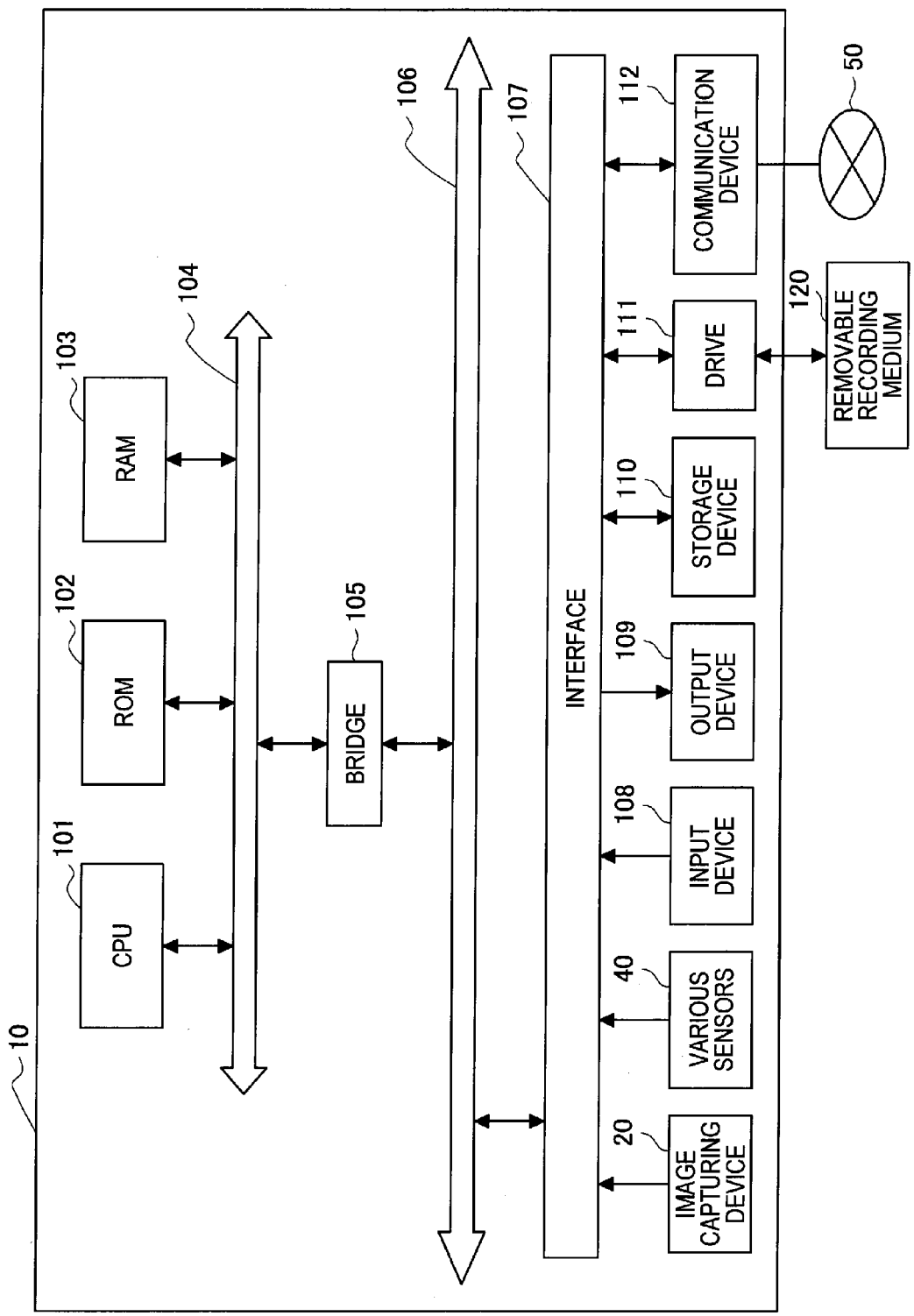
FIG. 4 is a block diagram illustrating a hardware configuration of an information processing device according to an embodiment of the invention.

Hereinbefore, the overview of the information processing device 10 was described. Next, a hardware configuration of the information processing device 10 is described with reference to FIG. 4. FIG. 4 is a block diagram illustrating a hardware configuration of the information processing device 10. The information processing device 10 includes a Central Processing Unit (CPU) 101, a Read Only Memory (ROM) 102, a Random Access Memory (RAM) 103, a host bus 104, a bridge 105, an external bus 106, an interface 107, an input device 108, an output device 109, a storage device (HDD) 110, a drive 111, a communication device 112, an image capturing device 20, and various sensors 40.

The CPU 101 functions as a calculation processing device and a control device to control overall operations of the information processing device 10 according to various programs. In addition, the CPU 101 may be a microprocessor. The ROM 102 stores programs, calculation parameters, or the like used by the CPU 101. The RAM 103 temporarily stores programs used for execution of the CPU 101, parameters appropriately changed in the execution, or the like. These components are connected to each other via a host bus 104 which is constructed with a CPU bus or the like.

The host bus 104 is connected to an external bus 106 such as a Peripheral Component Interconnect/Interface (PCI) bus through a bridge 105. In addition, the host bus 104 is not necessary configured to be separated from the bridge 105 and the external bus 106. The functions of these buses may be embedded in one bus.

The input device 108 is constructed with, for example, an input unit through which a user inputs information, such as a mouse, a keyboard, a touch panel, a button, a microphone, a switch, a lever, or the like, an input control circuit which generates an input signal based on the user's input and outputs the input signal to the CPU 101, and the like. The user of the information processing device 10 can input various types of data or make a command to perform a processing operation with respect to the information processing device 10 by manipulating the input device 108.

The output device 109 is constructed with, for example, a display device such as a Cathode Ray Tube (CRT) display device, a liquid crystal display (LCD) device, an Organic Light Emitting Display (OLED) device, a lamp, or the like and a sound output unit such as a speaker, a headphone, or the like. The output device 109 outputs, for example, reproduced contents. More specifically, the display device displays various types of information such as reproduced image data as a text or an image. On the other hand, the sound output unit converts the reproduced sound data or the like into sound and outputs the sound. The later-described display device 30 is an example of an output device 109.

The storage device 110 is a device for storing data, which is configured as an example of a storage unit of the information processing device 10 according to the embodiment. The storage device 110 may includes a storage medium, a recording device which records data on the recording medium, a reading apparatus which reads data from the recording medium, a removing apparatus which removes data recorded in the storage medium, and the like. The storage device 110 is constructed with, for example, a Hard Disk Drive (HDD). The storage device 110 drives the hard disk to store programs executed by the CPU 101 or various data. In addition, in the storage device 110, later-described items, identification numbers, and the like are stored.

The drive 111 is a reader/writer for the storage medium, which is built in or attached to an outer portion of the information processing device 10. The drive 111 reads information recorded in a removable recording medium 24 mounted thereon, such as a magnetic disk, an optical disk, an opto-magnetic disk, or a semiconductor memory, and outputs the information to the RAM 103.

The communication device 112 is, for example, a communication interface which is constructed with a communication device or the like for connection to a communication network 50. In addition, the communication device 112 may be a communication device corresponding to a wireless Local Area Network (LAN), a communication device corresponding to a wireless USB, a wired communication device which performs communication through a wired line.

The image capturing device 20 has a function of capturing an image of a photographic subject by transforming light passing through the photographing lens to an electrical signal by a CCD and converting the analog signal to a digital signal. An image captured by the image capturing device 20 is displayed on a display device. Various sensors 40 are sensors for recognizing the virtual space, and for example, a geomagnetic compass or an acceleration sensor may be exemplified. In addition, as an example of the various sensors 40, a gravitational direction detecting device 41 capable of detecting the gravitational direction may be exemplified.

[4] Functional Configuration of Information Processing Device

Hereinbefore, the hardware configuration of the information processing device 10 was described.

Figure 5:
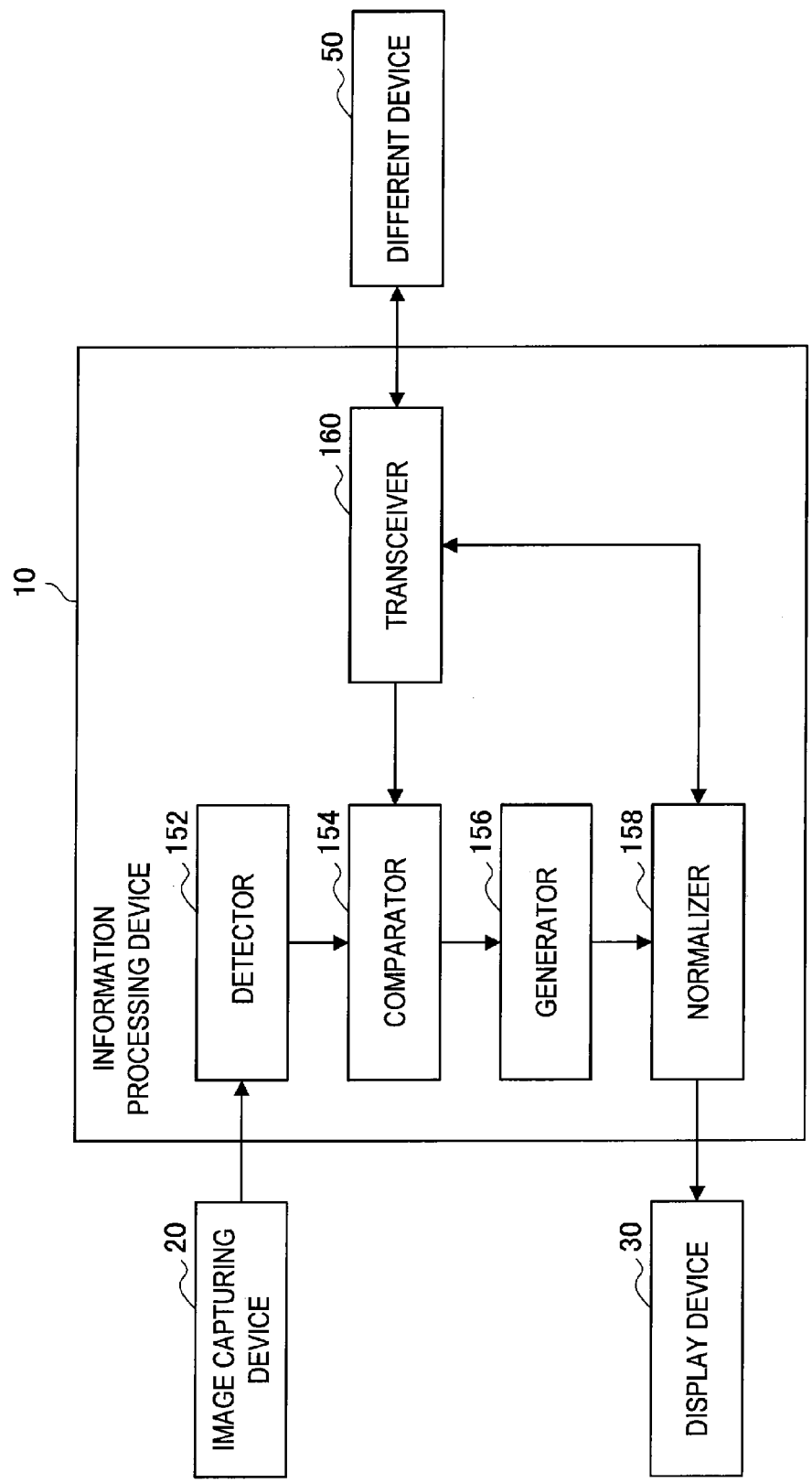
FIG. 5 is a block diagram illustrating a functional configuration of the information processing device according to the embodiment.

Next, the functional configuration of the information processing device 10 according to the embodiment is described with reference to FIG. 5. In addition, the functional configuration is described appropriately with reference to FIGS. 6 and 8. FIG. 5 is a block diagram illustrating the functional configuration of the information processing device 10 according to the embodiment.

As illustrated in FIG. 5, the information processing device 10 includes a detector 152, a comparator 154, a generator 156, a normalizer 158, a transceiver 160, and the like.

The detector 152 has a function of detecting a different device which can transmit and receive predetermined information. The predetermined information is position information, posture information, and the like of the different device. The detector 152 detects the posture information of the different device and supplies the posture information to the comparator 154. Herein, with respect to the posture information, an inclination or a direction of the main body of the device can be detected by using an acceleration sensor and the like. In addition, the posture information may be represented by the space coordinate system of each device.

In addition, the posture information may be configured to be detected by the detector 152 only in the case where the execution of normalization of the space coordinate system is commanded according to the user's manipulation. For example, in the case where a plurality of the devices exists, the posture information of the device to which the execution of normalization of the space coordinate system is commanded may be configured to be acquired.

The comparator 154 has a function of comparing the posture information of the different device supplied by the detector 152 with the posture information of the current device. More specifically, the comparator 154 compares the posture information of the different device with the posture information of the current device to determine whether or not the posture information of the two devices is coincident with each other. Whether or not the posture information is coincident with each other may be determined based on whether or not the space coordinate system of the different device and the space coordinate system of the current device are coincident with each other. In addition, whether or not the space coordinate system of the different device and the space coordinate system of the current device are coincident with each other may be determined by using a global coordinate system having a gravitational direction as a reference. The global coordinate system described herein is a coordinate system having the gravitational direction as one of axial directions.

The comparator 154 can also obtain the posture information of the different device by analyzing the image of the different device which is captured by the image capturing device 20 and calculate a difference between the posture information of the different device thus obtained and the posture information of the current device. The difference calculated in this way corresponds to relative posture information and can be used to determine whether or not the posture information of the different device and the posture information of the current device are coincident with each other.

The comparator 154 can also receive, from the different device, the posture information of the different device (for example, a difference between a predetermined reference value and the posture information of the different device) which is obtained in the different device by using various sensors such as an acceleration sensor and calculate a difference between the posture information of the different device thus received and the posture information of the current device (for example, a difference between a predetermined reference value shared with the different device and the posture information of the current device). The difference calculated in this way can also be used to determine whether or not the posture information of the different device and the posture information of the current device are coincident with each other.

Herein, coincidence of directions of the coordinate systems between the devices is described with reference to FIG. 6. FIG. 6 is a view for explaining coincidence of directions of the coordinate systems between the devices. The explaining view 320 of FIG. 6 illustrates a state where the posture information of the information processing device 10 (device A) and the posture information of the different device (device B) are not coincident with each other. In other words, in the explaining view 320, the directions of the space coordinate systems between the device A and the device B are not coincident with each other.

The explaining view 322 of FIG. 6 illustrates that the state where the directions of the space coordinate systems are not coincident with each other is changed into a state where the posture information of the device A and the posture information of the device B are coincident with each other by changing the posture of the device A and the posture of the device B. In other words, in the explaining view 322, the directions of the coordinate systems of the device A and the device B are coincident with each other. If the coordinate system of the device A is set to (X, Y, Z) and the coordinate system of the device B is set to (X', Y', Z'), the device A and the device B have the following relationship.

$$X=-X'$$

$$Y=Y'$$

$$Z=-Z'$$

Returning to FIG. 5, the generator 156 has a function of analyzing the three-dimensional space structure of the real space and generating the space coordinate system of the virtual space in the case where the posture information of the different device and the posture information of the current device correspond to each other as a result of comparison in the comparator 154. As the case where the posture information of the different device and the posture information of the current device correspond to each other, for example, a case where the posture information of the two devices is coincident with or opposite to each other can be exemplified.

In the embodiment, as illustrated in the explaining view 322 of FIG. 6, although the generator 156 is configured to generate the space coordinate system of the virtual space in the case where the posture information of the device A as a current device and the posture information of the device B as a different device are coincident with each other, the present invention is not limited to this example. For example, after each device generates the space coordinate system of the virtual space by analyzing the three-dimensional space structure of each real space, the space coordinate systems of several devices may be configured to be coincident with the space coordinate system of the different device.

Returning to FIG. 5, the normalizer 158 has a function of normalizing the space coordinate system of the different device based on the position information of the different device in the space coordinate system of the current device and the position information of the current device in the space coordinate system of the different device. More specifically, the normalizer 158 calculates a normalization value for normalizing the space coordinate system of the different device based on the distance between the different device and the current device in the space coordinate system generated by the different device and the distance between the current device and the different device in the space coordinate system generated by the generator 156.

Here, various methods can be applied to calculate the distance between the current device and the different device in the space coordinate system. For example, as a first example of the method for calculating the distance between the current device and the different device in the space coordinate system, a method for calculating the distance using the object recognition by image processing is conceivable. The object to be recognized here may also be in a form of a plane. That is, it is also possible to use the plane recognition as the object recognition.

In performing the object recognition, the detector 152 can extract features by analyzing an image in the real space which is captured by the image capturing device 20. Subsequently, the detector 152 can detect the position of the object as a relative position based on the extracted features while the position of the image capturing device 20 serves as a reference, and the generator 156 can perform the space recognition (generate a space coordinate) based on the detected relative position. Here, the image capturing device 20 is connected to the information processing device 10 (device A in the example illustrated in FIG. 8), the image captured by the image capturing device 20 is provided to the information processing device 10, and the image provided to the information processing device 10 is analyzed by the detector 152.

The detector 152 can calculate a distance from the image capturing device 20 to the different device 50 (device B in the example illustrated in FIG. 8) present in a predetermined direction in the recognized space (virtual space). In the example illustrated in FIG. 8, although the predetermined direction corresponds to the front direction (direction normal to the device A, i.e., Z-axis) of the image capturing device 20, the direction is not limited to this example. The detector 152 can detect the distance from the information processing device 10 to the difference device 50 in the virtual space by, for example, analyzing the image of the different device 50 captured by the image capturing device 20.

The method described above is the first example of the method for calculating the distance between the current device and the different device in the space coordinate system. Since the distance calculated in this way is calculated in the space coordinate generated by the generator 156, the distance corresponds to a relative distance between the information processing device 10 (current device) and the different device 50. Accordingly, the detector 152 can also convert such a relative distance into an absolute distance based on the distance of a predetermined interval in the real space and the distance of an interval, in the virtual space, which corresponds to the predetermined interval.

To be more specific, the detector 152 can, for example, obtain a value (a distance in the real space corresponding to a unit coordinate in the virtual space) by dividing the distance of the predetermined interval in the real space by the distance of the interval, in the virtual space, which corresponds to the predetermined interval, and multiply the relative distance by the obtained value to acquire the result of the multiplication as the absolute distance.

It is possible to set the distance of the predetermined interval in the real space to, for example, a predetermined value. More specifically, in the case where the distance of the predetermined interval in the real space is determined in advance as 1 M (meter), for example, the detector 152 can set the distance of the predetermined interval in the real space to 1 M and use the distance from the information processing device 10 (or image capturing device 20) to the object in the virtual space as the distance of the interval, in the virtual space, which corresponds to the predetermined interval. In this case, for example, the detector 152 is caused to display a message such as "Please perform calibration with the information processing device 10 (or image capturing device 20) and the object in the real space separated from each other by 1 M" on the display device 30, and thereafter the distance from the information processing device 10 (or image capturing device 20) to the object in the virtual space can be measured.

It is also possible to use the distance in the virtual space from the information processing device 10 (or image capturing device 20) to the different device 50 as the distance of the interval, in the virtual space, which corresponds to the predetermined interval in the real space. In this case, for example, the detector 152 is caused to display a message such as "Please perform calibration with the individual devices separated from each other by 1 M" on the display device 30, and thereafter the distance from the information processing device 10 (or image capturing device 20) to the different device 50 in the virtual space can be measured. It is needless to say that the distance of the predetermined interval in the real space may be any value other than 1 M.

Further, for example, as a second example of the method for calculating the distance between the current device and the different device in the space coordinate system, a method for calculating the distance using a predetermined measuring device is conceivable. As the predetermined measuring device, a measuring device such as a GPS sensor, a depth sensor, a geomagnetic compass, or an acceleration sensor can be used. The predetermined measuring device corresponds to, for example, the various sensors 40 illustrated in FIG. 4. The distance calculated in this way corresponds to the absolute distance between the information processing device 10 (current device) and the different device 50. Accordingly, in this case, an absolute virtual space coordinate is generated by the generator 156.

The transceiver 160 has a function of transmitting or receiving information for sharing the space coordinate system, and is an example of a transmitter or a receiver of the present disclosure. The transceiver 160 may transmit the space coordinate system of the different device normalized by the normalizer 158 to the different device and may transmit the normalization value calculated by the normalizer 158 to the different device. The different device to which the normalized space coordinate system is transmitted generates the space coordinate system of the virtual space by using the transmitted space coordinate system. In addition, the different device to which the normalization value is transmitted normalizes the space coordinate system of the virtual space by using the transmitted normalization value.

Herein, the normalization of the space coordinate system is described with reference to FIGS. 7A, 7B, and 8. FIG. 7A is a view for explaining coordinate units of the information processing device 10 (device A) and the different device (device B). When the information processing device 10 and the different device generate the respective the space coordinate systems of the virtual spaces, since the real spaces corresponding to the devices are also different, the space coordinate systems of the virtual spaces are generated based on different coordinate units. In other words, the scales of the space coordinate systems generated by the devices are different from each other.

As illustrated in FIG. 7A, the coordinate unit 331 of the space coordinate system of the virtual space generated by the generator 156 of the information processing device 10 (device A) and the coordinate unit 333 of the space coordinate system of the virtual space generated by the different device (device B) become different from each other. In this manner, in the case where the coordinate unit 331 of the space coordinate system of the device A and the coordinate unit 333 of the space coordinate system of the device B are different from each other, the position of the virtual object between the devices cannot correctly recognized. Therefore, the coordinate unit of the different space coordinate system is normalized by the normalizer 158, and the position of the virtual object is shared.

The normalization of the space coordinate system in the normalizer 158 is described with reference to FIG. 7B. The normalizer 158 acquires the coordinate unit to the device B in the space coordinate system (XYZ coordinate system) of the device A. In addition, the coordinate unit to the device A in the space coordinate system (X'Y'Z' coordinate system) of the device B is acquired. The coordinate unit to the device A in the space coordinate system of the device B is received from the device B, which is the different device, by the transceiver 160.

The normalization value a for normalizing the space coordinate systems of the device A and the device B is calculated according to the following Equation.

(Normalization Value $a$)=(Distance (coordinate unit) to Device $A$ in $X'Y'Z'$ Coordinate System)/(Distance (coordinate unit) to Device $B$ in $XYZ$ Coordinate System)

The space coordinate system of the device B can be normalized by using the normalization value a calculated according to the above Equation. The normalization of the space coordinate system of the device B is described with reference to FIG. 8. FIG. 8 is a view for explaining the normalization of the space coordinate system of the device B. As illustrated in FIG. 8, the space coordinate system of the device A is represented by the XYZ coordinate system, and the space coordinate system of the device B is represented by the X'Y'Z' coordinate system.

Figure 8:
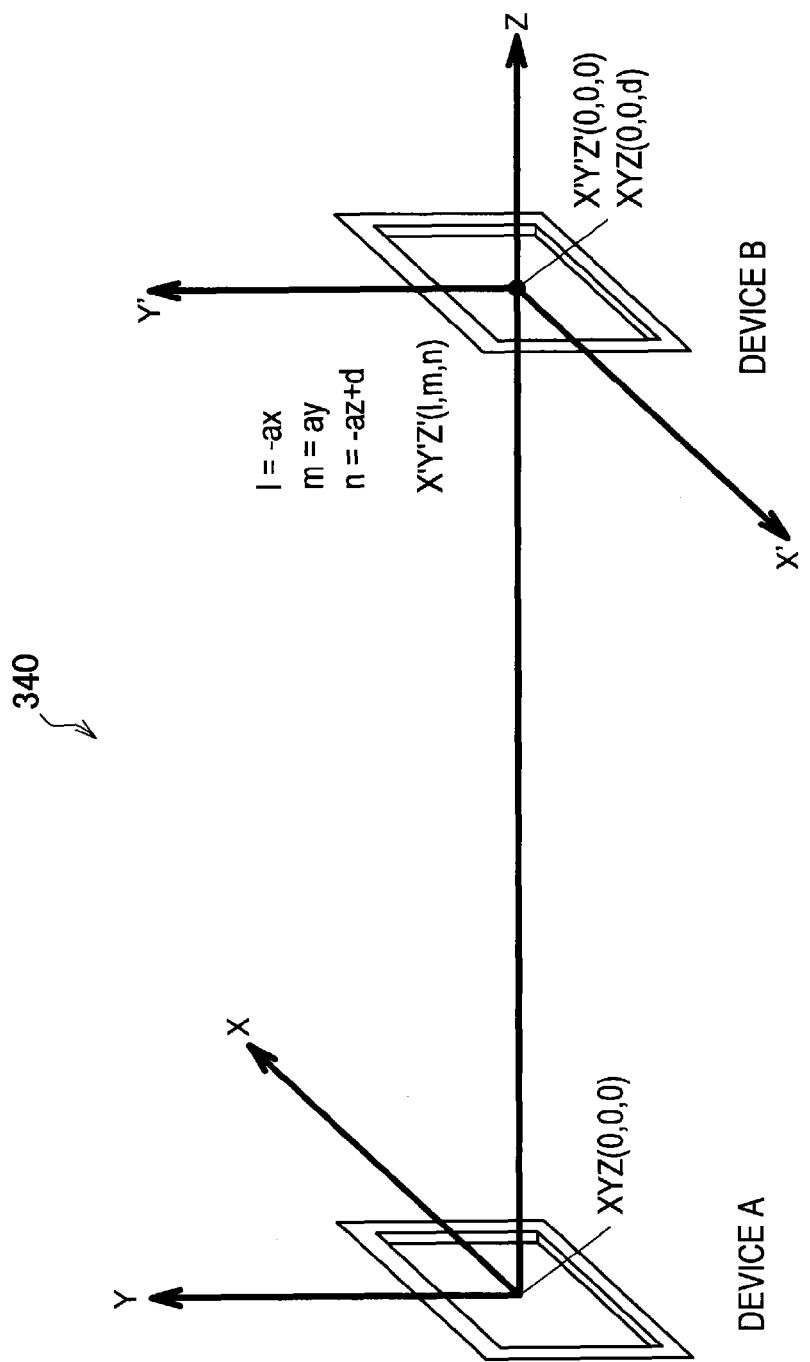
FIG. 8 is a diagram for explaining normalization of a space coordinate system according to the embodiment.

As illustrated in FIG. 8, the coordinate of the origin of the device A is represented by (0, 0, 0) in the space coordinate system (XYZ coordinate system) of the device A. The coordinate of the center of the device B is represented by (0, 0, d) in the space coordinate system (XYZ coordinate system) of the device B. Herein, d is a distance (coordinate unit) between the device A and the device B in the space coordinate system (XYZ coordinate system) of the device A.

The coordinate (l, m, n) in the space coordinate system (X'Y'Z' coordinate system) of the device B can be represented by using the normalization value a as follows.

$$l=-ax$$

$$m=ay$$

$$n=-az+d$$

As described above, the space coordinate system of the device B may be normalized in the device A, and the normalization result may be transmitted to the device B. In addition, the normalization value a calculated in the device A may be transmitted to the device B. As illustrated in FIG. 8, the space coordinate system of the device B is represented by the space coordinate system of the device A by using the normalization value, so that it is possible to appropriately determine the relationship of the position of the virtual object disposed in the virtual space between the two devices.

In addition, in FIG. 8, although the origin of the space coordinate system is set to the central point of the device, the present invention is not limited to the example. A point other than the central point of the device, a point capable of determining the relationship of the position with respect to the device such as a point separated by a predetermined distance from the device may also be set to the origin.

[5] Details of Operations of Information Processing Device

Figure 9:
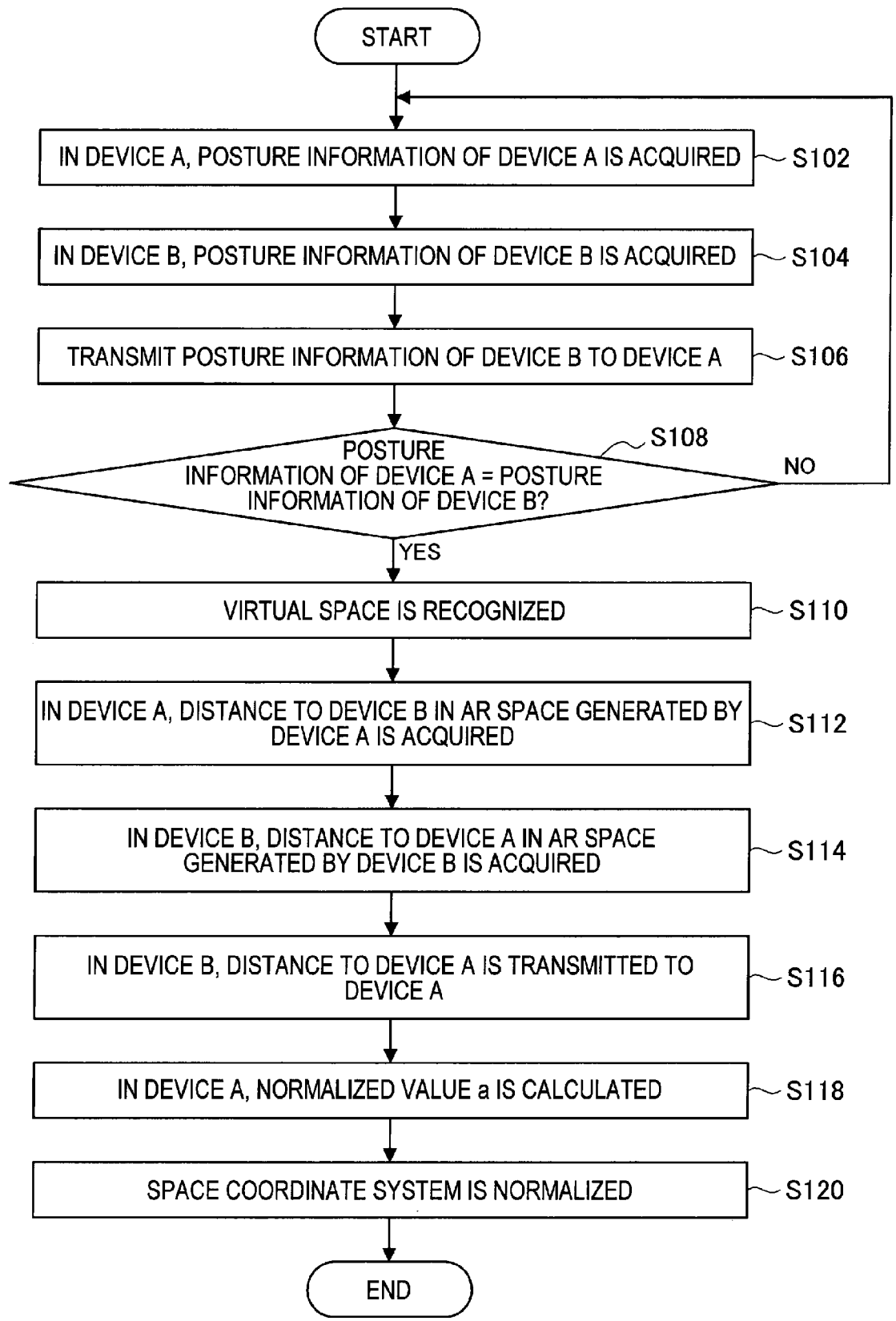
FIG. 9 is a flowchart illustrating details of operations of the information processing device according to the embodiment.

Hereinbefore, the functional configuration of the information processing device 10 was described. Next, the operations of the information processing device 10 are described in detail with reference to FIGS. 9 to 14. First, the process of the normalization of the space coordinate system of the different device (device B) in the information processing device 10 (device A) is described with reference to FIG. 9. FIG. 9 is a detailed flowchart illustrating the process of the normalization of the space coordinate system.

In FIG. 9, the information processing device 10 is described as the device A, and the different device is described as the device B. In the hereinafter description, the device B is described as an information processing device having the same functional configuration as that of the device A. As illustrated in FIG. 9, first, the detector 152 of the device A acquires the posture information of the device A (S102). Next, in the device B, the posture information of the device B is acquired (S104).

Next, the posture information acquired by the device B is transmitted to the device A, and the device A acquires the posture information of the device B through the transceiver 160 (S106). Next, the posture information of the device A acquired in Step S102 and the posture information of the device B received in Step S106 are compared with each other (S108).

In Step S108, in the case where the posture information of the device A and the posture information of the device B are coincident with each other, the generator 156 analyzes the three-dimensional space structure of the real space to recognize the virtual space (S110). In Step S110, the generator 156 generates the space coordinate system of the virtual space.

Next, the normalizer 158 of the device A acquires a distance to the device B in the AR space generated by the device A (S112). In addition, in the device B, a distance to the device A in the AR space generated by the device B is acquired (S114). The distance to the device A in the device B acquired in Step S114 is transmitted, and the distance is received through the transceiver 160 (S116).

Here, the process from Step S112 to Step S116 is performed while the distance between the device A and the device B is kept constant. This is because the space coordinate system can be shared between the device A and the device B by performing the process of the normalization based on the distance (coordinate unit) to the device B in the AR space of the device A and the distance (coordinate unit) to the device A in the AR space of the device B which are acquired for an identical distance.

Next, the normalizer 158 calculates a normalization value a for normalizing the space coordinate system of the device B from the distance to the device B in the AR space (virtual space) of the device A acquired in Step S112 and the distance to the device A in the device B received in Step S116. More specifically, the normalization value a is calculated by dividing the distance (coordinate unit) to the device A in the space coordinate system of the device B with the distance (coordinate unit) to the device B in the space coordinate system of the device A.

Figure 10:
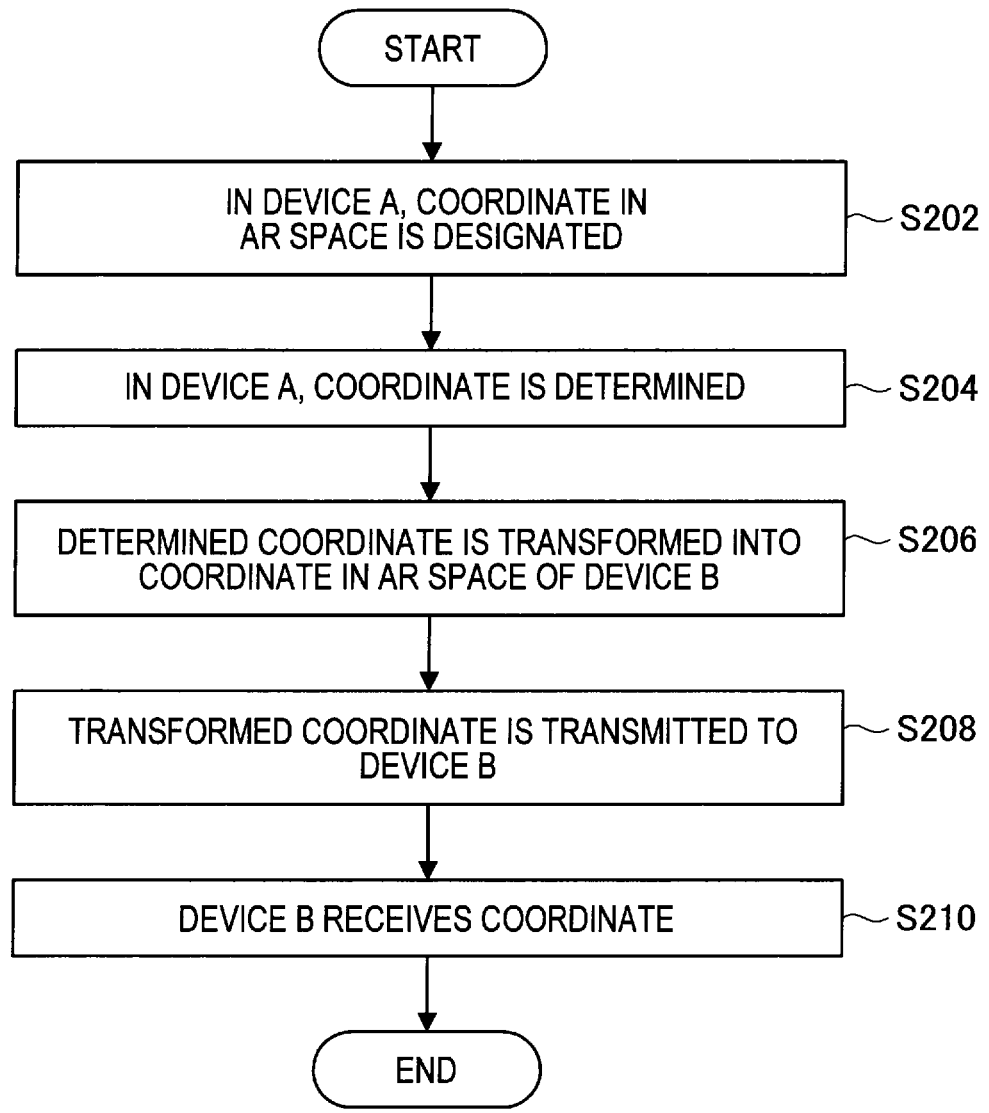
FIG. 10 is a flowchart illustrating details of operations of the information processing device according to the embodiment.
Figure 11:
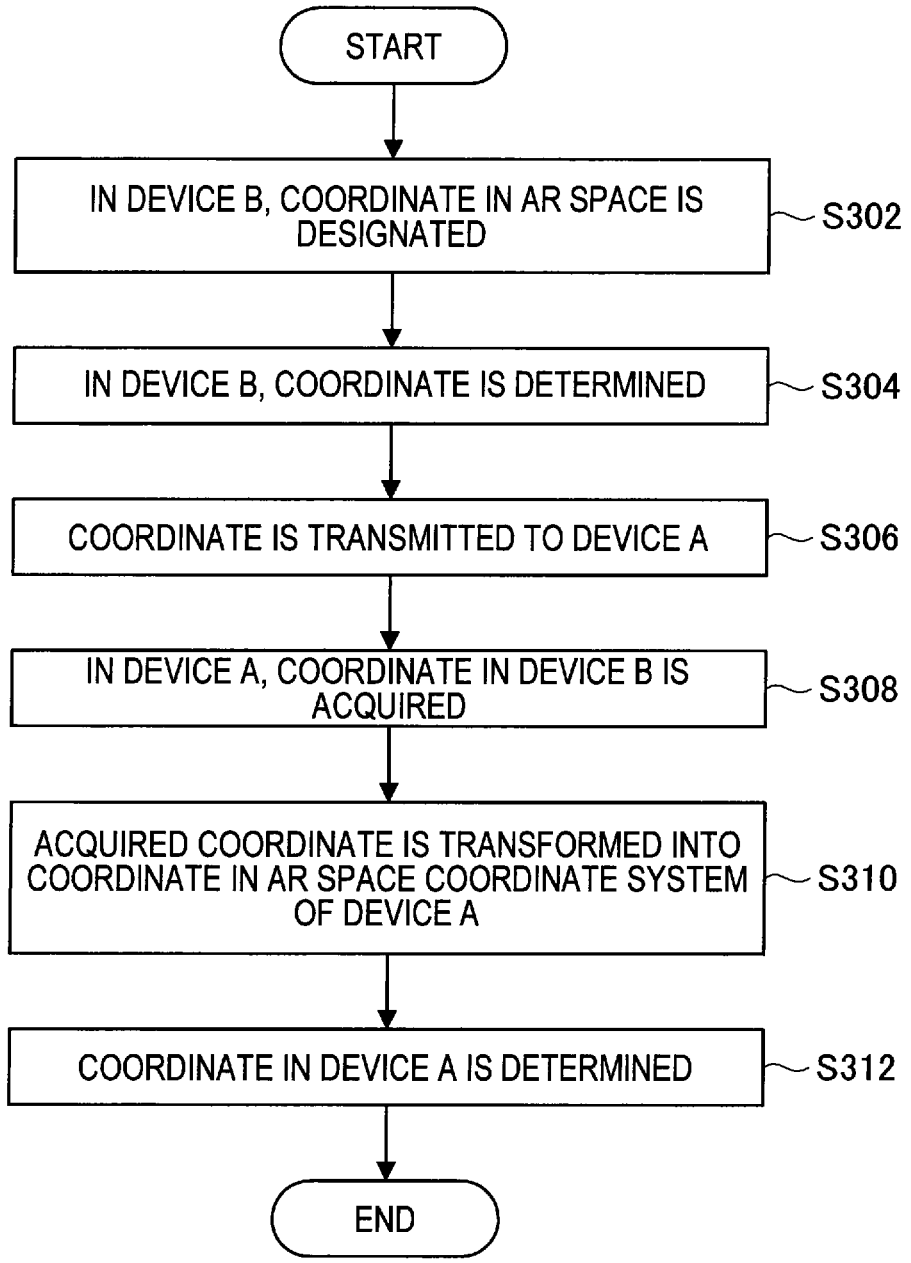
FIG. 11 is a flowchart illustrating details of operations of the information processing device according to the embodiment.

Hereinbefore, the process of the normalization of the space coordinate system was described. Next, the coordinate transformation process of the case where the coordinate of each device in the AR space is designated is described with reference to FIGS. 10 and 11. FIG. 10 is a flowchart illustrating the coordinate transformation process in the case where the coordinate of the device A in the AR space is designated. In addition, FIG. 11 is a flowchart illustrating the coordinate transformation process in the case where the coordinate of the device B in the AR space is designated.

As illustrated in FIG. 10, first, the coordinate of the device A in the AR space is designated (S202). In the device A, the coordinate designated in Step S202 is determined as the coordinate in the AR space (S204).

Next, the coordinate designated in Step S202 is transformed into the coordinate of the device B in the AR space coordinate system based on the normalization value a calculated by the normalizer 158 (S206). As described above, the coordinate (l, m, n) of the device B in the space coordinate system can be represented as (−ax, ay, −az+d) by using the normalization value a and the distance d between the devices. Therefore, the coordinate (x, y, z) designated in Step S202 is transformed into the coordinate (−ax, ay, −az+d) of the device B in the AR space coordinate system.

Next, the coordinate transformed in Step S206 is transmitted to the device B through the transceiver 160 (S208). The device B receives the coordinate transmitted in Step S208 (S210). In this manner, the coordinate designated in the device A is transformed into the coordinate of the device B in the AR space coordinate system, and the transformed coordinate is transmitted to the device B, so that the space coordinate system of the AR space is shared. Therefore, it is possible to appropriately determine the relationship of the position of the AR object disposed in the AR space.

Next, the coordinate transformation process in the case where the coordinate of the device B in the AR space is designated is described with reference to FIG. 11. As illustrated in FIG. 11, the coordinate of the device B in the AR space is designated (S302). In the device B, the coordinate in the AR space is determined by using the coordinate designated in Step S302 (S304). The coordinate designated in Step S302 is transmitted to the device A (S306).

In the device A, the coordinate transmitted in Step S306 is acquired (received) through the transceiver 160 (S308). The coordinate which is acquired in Step S308 and designated by the device B is transformed into the coordinate of the device A in the AR space coordinate system (S310). As described above, the coordinate of the device B in the AR space coordinate system can be represented as (−ax, ay, −az+d) by using the normalization value a and the distance d between the devices. Therefore, the coordinate designated in the device B is transformed into the coordinate of the device A in the space coordinate system by using the normalization value a and the distance d between the devices.

Next, the coordinate transformed in Step S310 is determined as the coordinate of the device A (S312). In this manner, even in the case where the coordinate of the device B is designated, the coordinate designated in the device B is transformed into the coordinate of the device A in the space coordinate system of the AR space, and the space coordinate system of the AR space is shared. Therefore, it is possible to appropriately determine the relationship of the position of the AR object disposed in the AR space.

Hereinbefore, the coordinate transformation process in the case where the coordinate of the device B in the AR space is designated was described. As described above, according to the information processing device 10 of the embodiment, between a plurality of devices capable of recognizing a virtual space by analyzing a three-dimensional space of a real space, it is possible to share the virtual object by normalizing the space coordinate system in each device and determining an appropriate position of the virtual object disposed in the virtual space.

[6] Modification of Details of Operations of Information Processing Device

Figure 12:
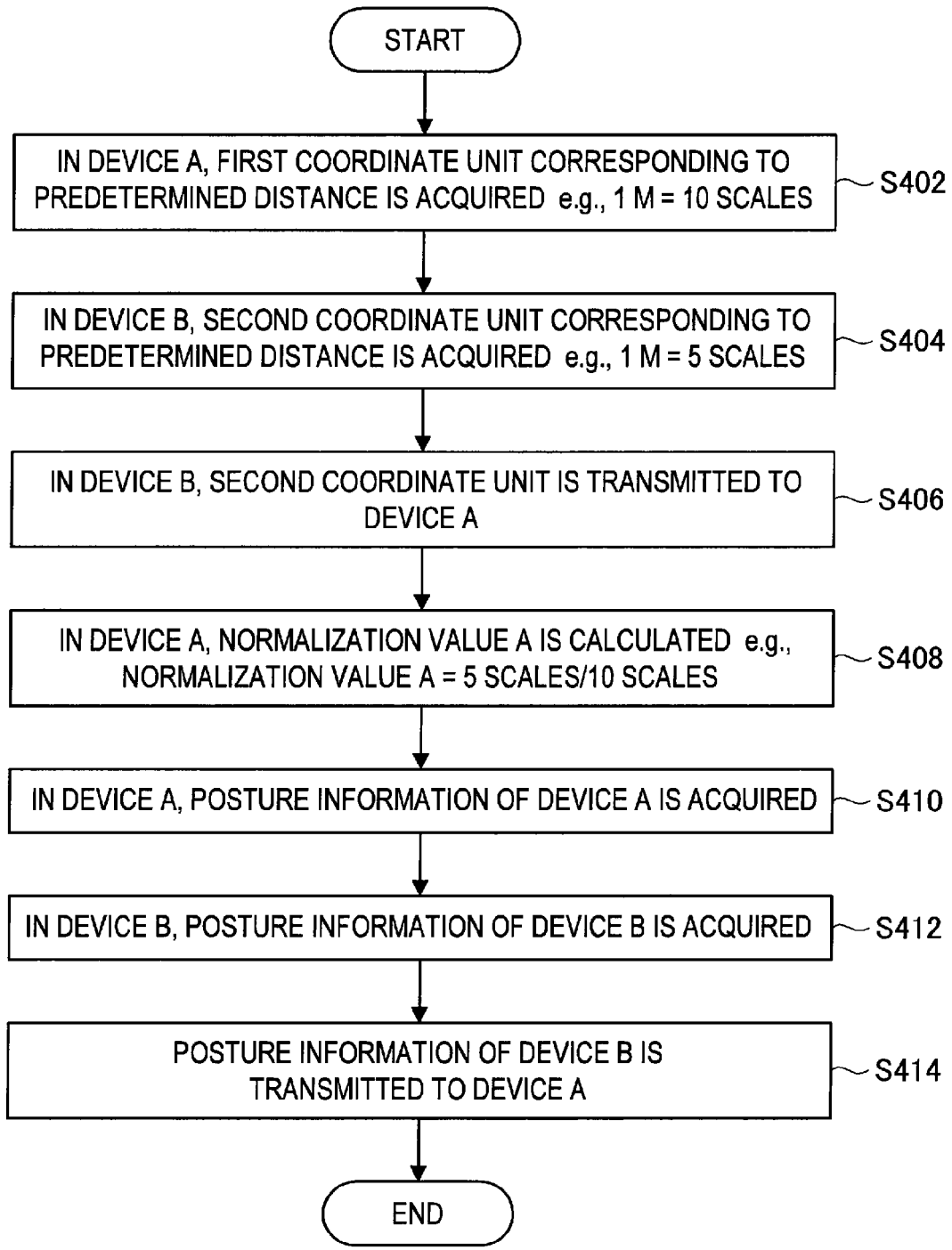
FIG. 12 is a flowchart illustrating a modification of details of operations of the information processing device according to the embodiment.

Next, the modification of details of the operations of the information processing device 10 will be described with reference to FIGS. 12 to 14. First, the process of the normalization of the space coordinate system of the different device (device B) in the information processing device 10 (device A) will be described with reference to FIG. 12. FIG. 12 is a detailed flowchart illustrating the process of the normalization of the space coordinate system. In FIG. 12, the information processing device 10 is described as the device A, and the different device is described as the device B. In the description hereinafter, the device B will also be described as an information processing device having the same functional configuration as the device A.

As illustrated in FIG. 12, first, the detector 152 of the device A acquires the first coordinate unit (S402) corresponding to a predetermined distance. For example, in the case where the predetermined distance is 1 M (meter), and a distance corresponding to 1 M in the virtual space coordinate of the device A corresponds to 10 scales, the 10 scales are acquired as the first coordinate unit. Next, the detector 152 of the device B acquires the second coordinate unit corresponding to the predetermined distance (S404). For example, in the case where the predetermined distance is 1 M (meter), and a distance corresponding to 1 M in the virtual space coordinate of the device B corresponds to 5 scales, the 5 scales are acquired as the second coordinate unit.

Then, the second coordinate unit acquired by the device B is transmitted to the device A (S406), and the device A acquires the second coordinate unit through the transceiver 160. Then, the normalizer 158 of the device A calculates a normalization value a based on the first coordinate unit acquired in Step S402 and the received second coordinate unit (S408). To be more specific, the normalizer 158 of the device A calculates the normalization value a by dividing the second coordinate unit by the first coordinate unit.

Next, the detector 152 of the device A acquires the posture information of the device A (S410). Then, the posture information of the device B is acquired in the device B (S412). Thereafter, the posture information acquired in the device B is transmitted to the device A (S414), and the device A acquires the posture information of the device B through the transceiver 160. As described above, the comparator 154 can also obtain the posture information of the different device by analyzing the image of the different device which is captured by the image capturing device 20 and calculate a difference between the posture information of the different device thus obtained and the posture information of the current device. If the difference calculated in this way is used, the process in Step S412 and the process in Step S414 may be omitted.

Hereinbefore, the modification of the process of the normalization of the space coordinate system has been described. Next, the coordinate transformation process of the case where the coordinate of each device in the AR space is designated will be described with reference to FIGS. 13 and 14. FIG. 13 is a flowchart illustrating the modification of the coordinate transformation process in the case where the coordinate of the device A in the AR space is designated. In addition, FIG. 14 is a flowchart illustrating a modification of the coordinate transformation process in the case where the coordinate of the device B in the AR space is designated.

Figure 13:
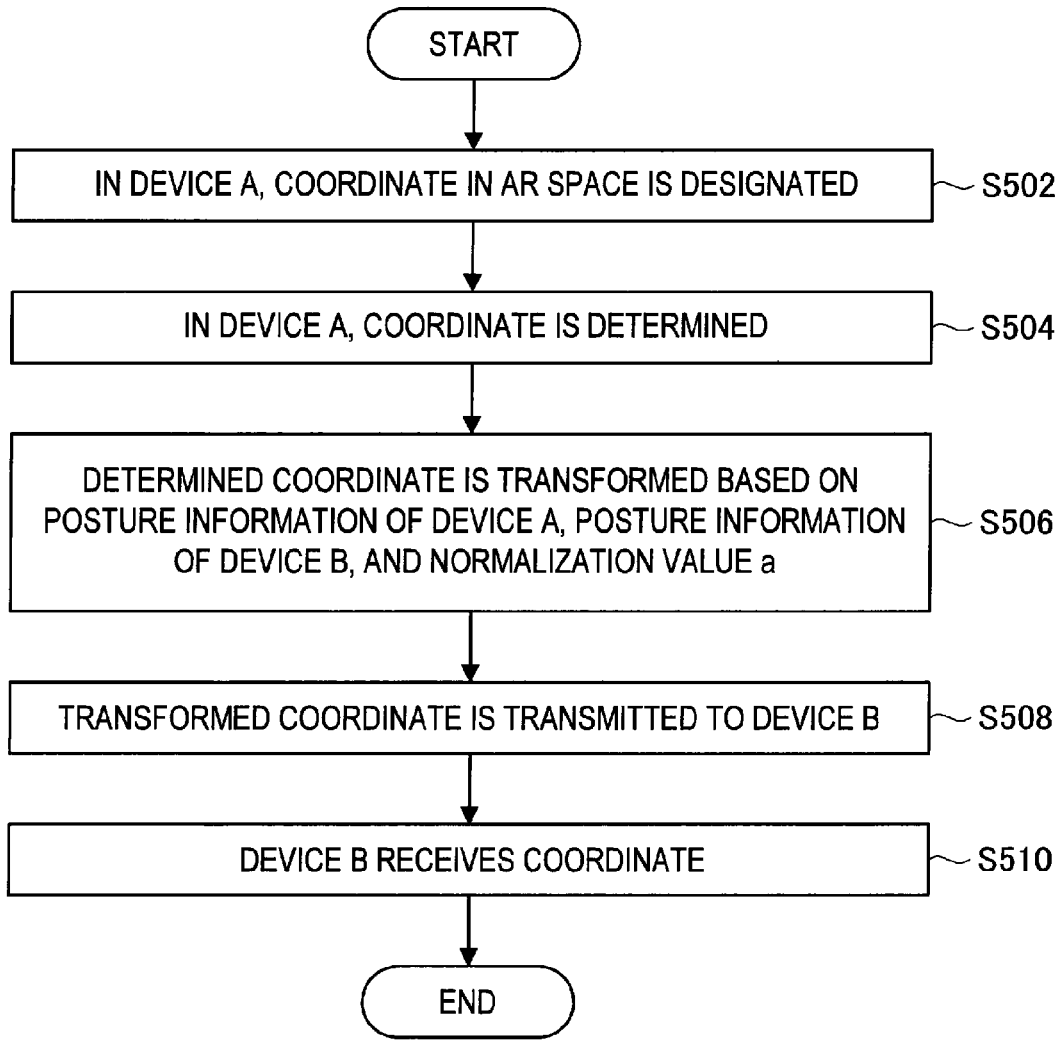
FIG. 13 is a flowchart illustrating a modification of details of operations of the information processing device according to the embodiment.
Figure 14:
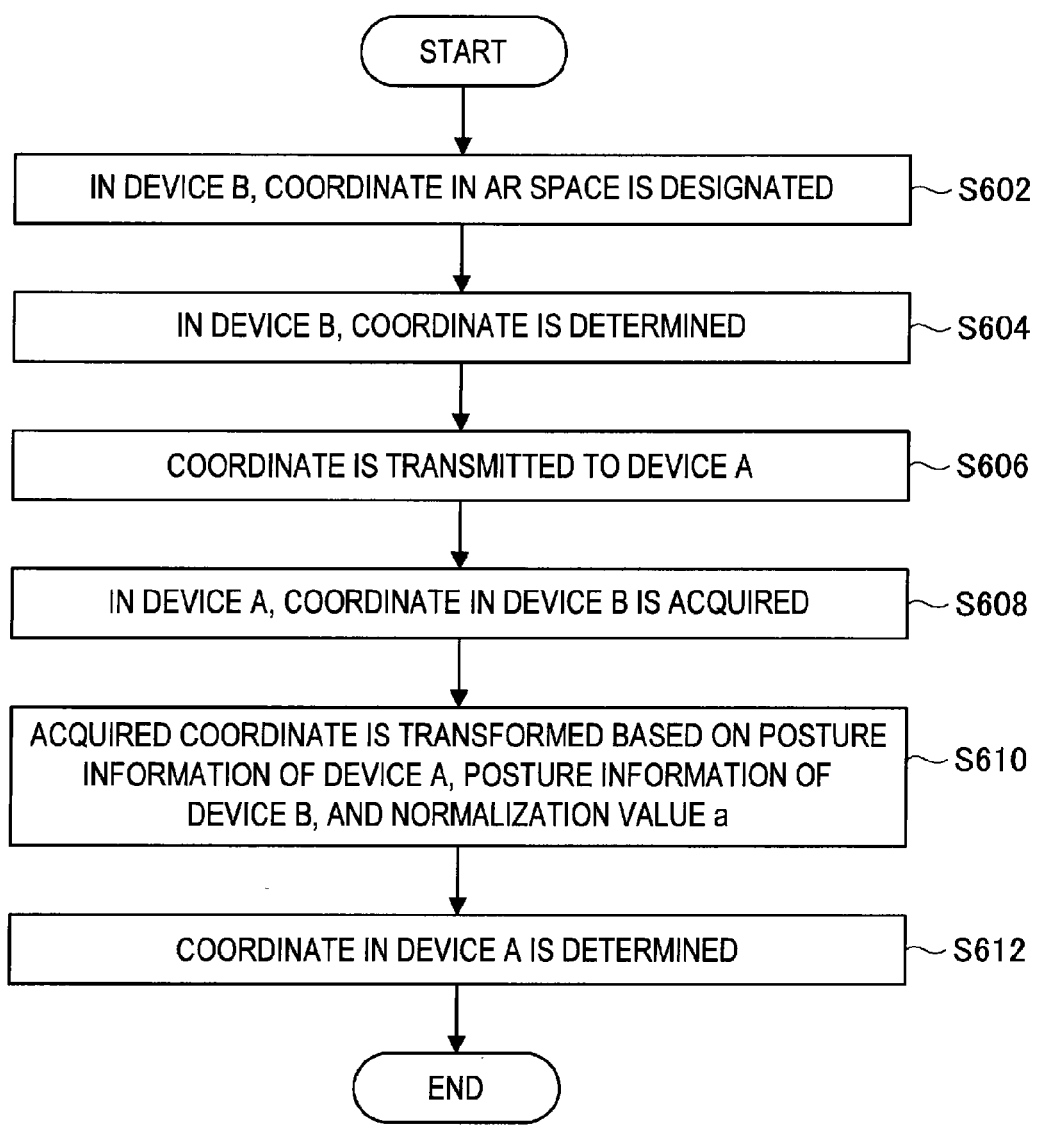
FIG. 14 is a flowchart illustrating a modification of details of operations of the information processing device according to the embodiment.

As illustrated in FIG. 13, first, the coordinate of the device A in the AR space is designated (S502). In the device A, the coordinate designated in Step S502 is determined as the coordinate in the AR space (S504).

Next, the coordinate designated in Step S502 is transformed into the coordinate of the device B in the AR space coordinate system based on the posture information of the device A, the posture information of the device B, and the normalization value a calculated by the normalizer 158 (S506). Next, the coordinate transformed in Step S506 is transmitted to the device B through the transceiver 160 (S508). The device B receives the coordinate transmitted in Step S508 (S510).

In this manner, the coordinate designated in the device A is transformed into the coordinate of the device B in the AR space coordinate system, and the transformed coordinate is transmitted to the device B, so that the space coordinate system of the AR space is shared. Therefore, it is possible to appropriately determine the relationship of the position of the AR object disposed in the AR space. For example, device B is able to control a displayed image in response to the received transformed coordinate.

Next, the modification of the coordinate transformation process in the case where the coordinate of the device B in the AR space is designated will be described with reference to FIG. 14. As illustrated in FIG. 14, the coordinate of the device B in the AR space is designated (S602). In the device B, the coordinate in the AR space is determined by using the coordinate designated in Step S602 (S604). The coordinate designated in Step S602 is transmitted to the device A (S606).

In the device A, the coordinate transmitted in Step S606 is acquired (received) through the transceiver 160 (S608). In the device A, the coordinate designated in Step 602 is transformed into the coordinate of the device B in the AR space coordinate system based on the posture information of the device A, the posture information of the device B, and the normalization value a calculated by the normalizer 158 (S610).

Next, the coordinate transformed in Step S610 is determined as the coordinate of the device A (S612). In this manner, even in the case where the coordinate of the device B is designated, the coordinate designated in the device B is transformed into the coordinate of the device A in the space coordinate system of the AR space, and the space coordinate system of the AR space is shared. Therefore, it is possible to appropriately determine the relationship of the position of the AR object disposed in the AR space. Device A may is then able to control a displayed image in response to the received transformed coordinate.

Hereinbefore, the modification of the coordinate transformation process in the case where the coordinate of the device B in the AR space is designated has been described. As described above, according to the information processing device 10 of the embodiment, between a plurality of devices capable of recognizing a virtual space by analyzing a three-dimensional space of a real space, it is possible to share the virtual object by normalizing the space coordinate system in each device and determining an appropriate position of the virtual object disposed in the virtual space.

It should be understood by those skilled in the art that various modifications, combinations, sub-combinations and alterations may occur depending on design requirements and other factors insofar as they are within the scope of the appended claims or the equivalents thereof.

For example, the steps in the process of the information processing device 10 described in the specification may not necessarily performed in time sequence according to the order disclosed as the flowchart. In other words, the steps in the process of the information processing device 10 may be performed in parallel in a different process. In addition, the shared coordinate system may be a global coordinate system having the gravitational direction. In addition, the process of the coordinate transformation may be performed in any one of the devices and may be performed in a cloud server.

In addition, the hardware such as a CPU, a ROM, and a RAM built in the information processing device 10 or the like may also be implemented by computer programs exhibiting the functions equivalent to those of the components of the aforementioned information processing device 10. In addition, a storage medium storing the computer programs is also provided.

REFERENCE SIGNS LIST 10 information processing device
152 detector
154 comparator
156 generator
158 normalizer
160 transceiver
20 image capturing device
30 display device

The invention claimed is:

1. An information processing apparatus, comprising:
circuitry configured to:
acquire first posture information corresponding to the information processing apparatus, a first distance coordinate corresponding to the information processing apparatus, second posture information corresponding to another information processing apparatus, and a second distance coordinate corresponding to the another information processing apparatus;
acquire an image with the another information processing apparatus that is in a field of view of the image;
determine, based on the acquired image, whether each direction of a coordinate system for the information processing apparatus respectively coincides with each direction of a coordinate system for the another information processing apparatus; and calculate a position of an object in a virtual space based on the first and second posture information and the first and second distance coordinates.

2. The information processing apparatus of claim 1, wherein the circuitry is further configured to:
detect the first posture information by detecting an orientation of the information processing apparatus.

3. The information processing apparatus of claim 1, wherein the circuitry is further configured to acquire the second posture information based on the acquired image.

4. The information processing apparatus of claim 1, wherein the circuitry is further configured to:
calculate a distance between the information processing apparatus and the another information processing apparatus in the virtual space.

5. The information processing apparatus of claim 1, wherein the circuitry is further configured to:
calculate a distance between the information processing apparatus and the another information processing apparatus in real space.

6. The information processing apparatus of claim 1, wherein the circuitry is further configured to recognize the virtual space based on the first and second posture information.

7. The information processing apparatus of claim 1, wherein the circuitry is further configured to calculate a normalization value based on a difference between the first distance coordinate and the second distance coordinate.

8. The information processing apparatus of claim 7, wherein the circuitry is further configured to determine a coordinate of the information processing apparatus in the virtual space, and transform the coordinate into a coordinate in the virtual space of the another information processing apparatus based on the normalization value.

9. The information processing apparatus of claim 8, further comprising:
an interface configured to transmit the transformed coordinate to the another information processing apparatus.

10. The information processing apparatus of claim 7, further comprising:
an interface configured to receive a coordinate from the another information processing apparatus, wherein the circuitry is further configured to transform the coordinate into a coordinate in the virtual space of the information processing apparatus based on the normalization value.

11. The information processing apparatus of claim 1, wherein the first distance coordinate corresponds to a first distance scaling factor and the second distance coordinate corresponds to a second distance scaling factor.

12. The information processing apparatus of claim 11, wherein the circuitry is further configured to calculate a normalization value based on the first and second distance scaling factors.

13. The information processing apparatus of claim 11, wherein the circuitry is further configured to calculate a normalization value by dividing the first distance scaling factor by the second distance scaling factor.

14. The information processing apparatus of claim 12, wherein the circuitry is further configured to designate a coordinate of the information processing apparatus in the virtual space, and transform the coordinate based on the first and second posture information and the normalization value.

15. The information processing apparatus of claim 14, further comprising:
an interface configured to transmit the transformed coordinate to the another information processing apparatus.

16. The information processing apparatus of claim 12, further comprising:
an interface configured to receive a coordinate from the another information processing apparatus.

17. The information processing apparatus of claim 16, wherein the circuitry is further configured to transform the coordinate based on the first and second posture information and the normalization value.

18. The information processing apparatus of claim 17, further comprising:
a display, wherein the circuitry is further configured to control the display to display the object based on the transformed coordinate.

19. An information processing method performed by an information processing apparatus, the method comprising:
acquiring, by circuitry of the information processing apparatus, first posture information corresponding to the information processing apparatus, and a first distance coordinate corresponding to the information processing apparatus;
acquiring, by an interface of the information processing apparatus, second posture information corresponding to another information processing apparatus and a second distance coordinate corresponding to the another information processing apparatus;
acquiring, by the circuitry of the information processing apparatus, an image with the another information processing apparatus that is in a field of view of the image;
determining, based on the acquired image, whether each direction of a coordinate system for the information processing apparatus respectively coincides with each direction of a coordinate system for the another information processing apparatus; and
calculating, by the circuitry of the information processing apparatus, a position of an object in a virtual space based on the first and second posture information and the first and second distance coordinates.

20. A non-transitory computer-readable medium including computer program instructions, which when executed by an information processing apparatus, cause the information processing apparatus to perform a method comprising:
acquiring first posture information corresponding to the information processing apparatus and a first distance coordinate corresponding to the information processing apparatus;
acquiring second posture information corresponding to another information processing apparatus, and a second distance coordinate corresponding to the another information processing apparatus;
acquiring an image with the another information processing apparatus that is in a field of view of the image;
determining, based on the acquired image, whether each direction of a coordinate system for the information processing apparatus respectively coincides with each direction of a coordinate system for the another information processing apparatus; and
calculating a position of an object in a virtual space based on the first and second posture information and the first and second distance coordinates.

* * * * *